United States Patent
Laliberte et al.

(10) Patent No.: US 12,128,489 B2
(45) Date of Patent: Oct. 29, 2024

(54) BLADE-HEIGHT OPTIMIZATION INDICATOR FOR A TABLE SAW

(71) Applicant: Robert Bosch GmbH, Stuttgart (DE)

(72) Inventors: Eric Laliberte, Naperville, IL (US); Eric Mallory, Naperville, IL (US)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 17/554,427

(22) Filed: Dec. 17, 2021

(65) Prior Publication Data

US 2023/0191510 A1 Jun. 22, 2023

(51) Int. Cl.
| | | |
|---|---|---|
| *B23D 59/00* | (2006.01) | |
| *B27G 19/02* | (2006.01) | |
| *B27G 19/08* | (2006.01) | |
| *F21V 23/04* | (2006.01) | |
| *F21V 33/00* | (2006.01) | |
| *F21W 111/00* | (2018.01) | |

(52) U.S. Cl.
CPC .......... *B23D 59/002* (2013.01); *B27G 19/02* (2013.01); *F21V 23/0471* (2013.01); *F21V 33/008* (2013.01); *B27G 19/08* (2013.01); *F21W 2111/00* (2013.01)

(58) Field of Classification Search
CPC ........ B27G 19/02; B27G 19/08; B27B 21/00; B23D 59/002; Y10T 83/7726
See application file for complete search history.

(56) References Cited

U.S. PATENT DOCUMENTS

| | | | |
|---|---|---|---|
| 8,336,432 B1 | 12/2012 | Butler | |
| 9,662,797 B2 * | 5/2017 | Dammertz | B27G 19/02 |
| 9,873,158 B2 * | 1/2018 | Koegel | B23D 59/002 |
| 10,870,216 B2 | 12/2020 | Schill et al. | |
| 2009/0241748 A1 * | 10/2009 | Keller | B26D 7/22 |
| | | | 83/522.13 |
| 2010/0037739 A1 * | 2/2010 | Anderson | B27G 19/02 |
| | | | 83/477.2 |
| 2010/0106284 A1 * | 4/2010 | Krapf | B23Q 11/0082 |
| | | | 700/177 |
| 2012/0048090 A1 | 3/2012 | Etter et al. | |
| 2017/0311310 A1 * | 10/2017 | Ryu | H04W 88/08 |
| 2018/0085837 A1 | 3/2018 | Koegel et al. | |
| 2022/0176580 A1 * | 6/2022 | Ottemeier | B27B 5/222 |

FOREIGN PATENT DOCUMENTS

| | | | | | |
|---|---|---|---|---|---|
| CN | 106827070 A | * | 6/2017 | | B27B 5/29 |
| CN | 115283750 A | * | 11/2022 | | B23D 45/06 |
| DE | 202008014372 U1 | * | 10/2009 | | B27G 19/10 |

OTHER PUBLICATIONS

DE202008014372U1 English translation; Oct. 15, 2009 Wilhelm.*
CN-115283750-A English Translation; Nov. 4, 2022; Fang C.*

* cited by examiner

*Primary Examiner* — Laura M Lee
(74) *Attorney, Agent, or Firm* — Charles Duncan; Maginot, Moore & Beck LLP

(57) ABSTRACT

A blade-height optimization indicator for a table saw determines based on the rotational position of one or more blade guards of the table saw as they are displaced by a workpiece being cut whether the blade-height of the table saw is optimized relative to the thickness of the workpiece and provides a visual GO/NO-GO indication depending on whether the blade height is determined to be optimized.

13 Claims, 10 Drawing Sheets

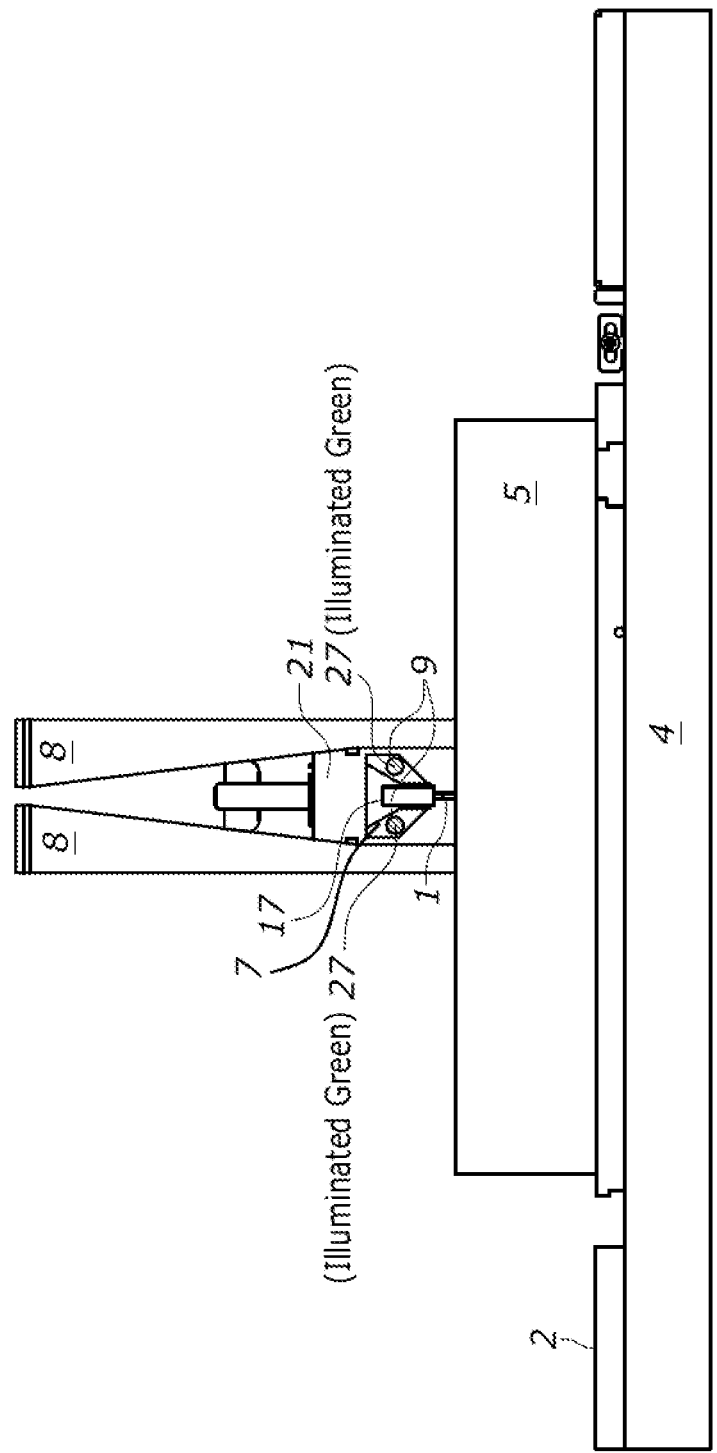

BLADE-HEIGHT OPTIMIZATION INDICATOR FOR A TABLE SAW

TECHNICAL FIELD

This disclosure relates to a blade-height optimization indicator for a table saw. The blade-height optimization indicator determines based on the rotational position of one or more blade guards of the table saw whether the blade-height of the table saw is optimized relative to the thickness of a workpiece being cut on the table saw. If the blade-height is optimized, a display of the blade-height optimization indicator provides a visual GO indication, such as by illuminating a green light emitting diode (LED). If the blade-height is not optimized, the display provides a visual NO-GO indication, such as by illuminating a red LED.

BACKGROUND

A table saw performs best when its blade-height is optimized relative to the thickness of the workpiece. As a rule, when cutting a workpiece, the blade should not protrude more than approximately 1 cm above the top of the workpiece. This improves saw performance and reduces the likelihood of serious injuries from unintentional contact with the blade. At the same time, if the blade-height is too low relative to the workpiece, the workpiece will not be cut through. Accordingly, there is a need for a blade-height optimization indicator for a table saw that detects the height of the workpiece relative to the blade and provides a clear visual indication of whether the blade-height is optimized.

SUMMARY

One aspect of this disclosure is directed to a blade-height optimization indicator for a table saw. The blade-height optimization indicator comprises a first angle sensor adapted to output a first angle sensor signal indicative of the angular position about an axis of rotation of a first blade guard of the table saw and, optionally, a second angle sensor adapted to output a second angle sensor signal indicative of the angular position about an axis of rotation of a second blade guard of the table saw. Additionally, the blade-height optimization indicator may comprise a vibration sensor adapted to output a vibration sensor signal indicative of the vibration of the table saw, from which signal it can be determined whether the table saw is in use (e.g., whether the blade is spinning). The blade-height optimization indicator may further comprise a proximity sensor adapted to output a proximity sensor signal indicative of a height of the proximity sensor above a surface of the table saw, from which signal a blade-height can be determined.

The blade-height optimization indicator further comprises a controller adapted to receive the first angle sensor signal and output a first indicator control signal which indicates based on the first angle sensor signal whether the blade-height of the table saw is optimized relative to the thickness of a workpiece (based on the displacement of the first blade guard by the workpiece as the workpiece is urged by a user towards the blade of the table saw). When a second angle sensor is the present, the controller is further adapted to receive the second angle sensor signal and output a second indicator control signal which indicates based on the second angle sensor signal whether the blade-height of the table saw is optimized relative to the thickness of a workpiece (based on the displacement of the second blade guard by the workpiece). The second indicator control signal is independent of and may contradict the first indicator control signal, as the first indicator control signal depends on the position of the first blade guard of the table saw and the second indicator control signal depends on the position of the second blade guard of the table saw (which moves independently of the first blade guard). When a vibration sensor is present, the controller is further adapted to receive the vibration sensor signal and output an illumination control signal based on the vibration sensor signal. When a proximity sensor is present, the controller is further adapted to receive the proximity sensor signal and output a blade height signal based on the proximity sensor signal.

The blade-height optimization indicator further comprises a display. The display is adapted to receive the first indicator control signal from the controller and visually indicate based on the first indicator control signal whether the blade-height is optimized. Where a second angle sensor is present, the display is further adapted to receive the second indicator control signal from the controller and separately visually indicate based on the second indicator control signal whether the blade-height is optimized. As noted above, the first and second indicator control signals are independent of and may contradict each other, as they each depend on the position of their respective blade guard.

The display may visually indicate whether the blade-height is optimized by way of one or (where applicable) two GO LEDs, with each GO LED corresponding to the first or second blade guard of the table saw, and each GO LED activating while the indicator control signal associated with its corresponding blade guard indicates that the blade-height is optimized. The visual indications may further be provided by one or (where applicable) two NO-GO LEDs, with each NO-GO LED corresponding to the first or second blade guard of the table saw, and each NO-GO LED activating while the indicator control signal associated with its corresponding blade guard indicates that the blade height is not optimized. The GO LEDs are preferably of a first color, such as green, while the NO-GO LEDs are preferably of a second color, such as red. The GO and NO-GO LEDs are optionally adapted to emit light into the blade guards of the table saw such that a blade guard is illuminated in the first color (e.g., green) while its associated GO LED is activated and in the second color (e.g., red) while its associated NO-GO LED is activated.

The display may optionally comprise a white LED adapted to illuminate the workpiece. When equipped with a white LED, the display receives the illumination control signal from the controller and activates the white LED based on the illumination control signal. When a proximity sensor is present, the display may comprise a numeric display and be adapted to receive the blade height signal from the controller and update the numeric display to indicate based on the blade height signal the height of the blade.

The above aspects of this disclosure and other aspects will be explained in greater detail below with reference to the attached drawings.

BRIEF DESCRIPTION OF THE DRAWINGS

FIGS. 2a, 2b, and 2c provide front views, in three different use cases, of a table saw equipped with a blade-height optimization indicator.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 2B:
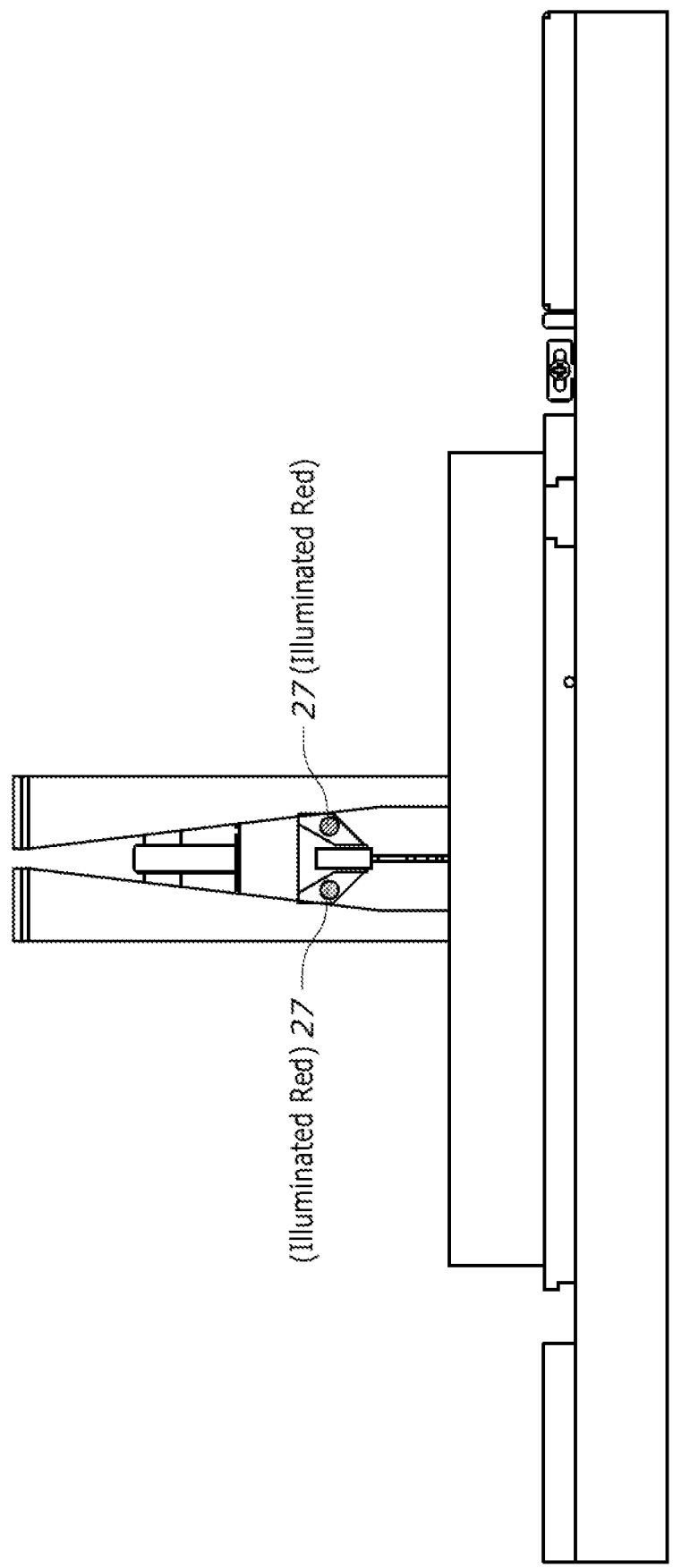
Figure 2C:
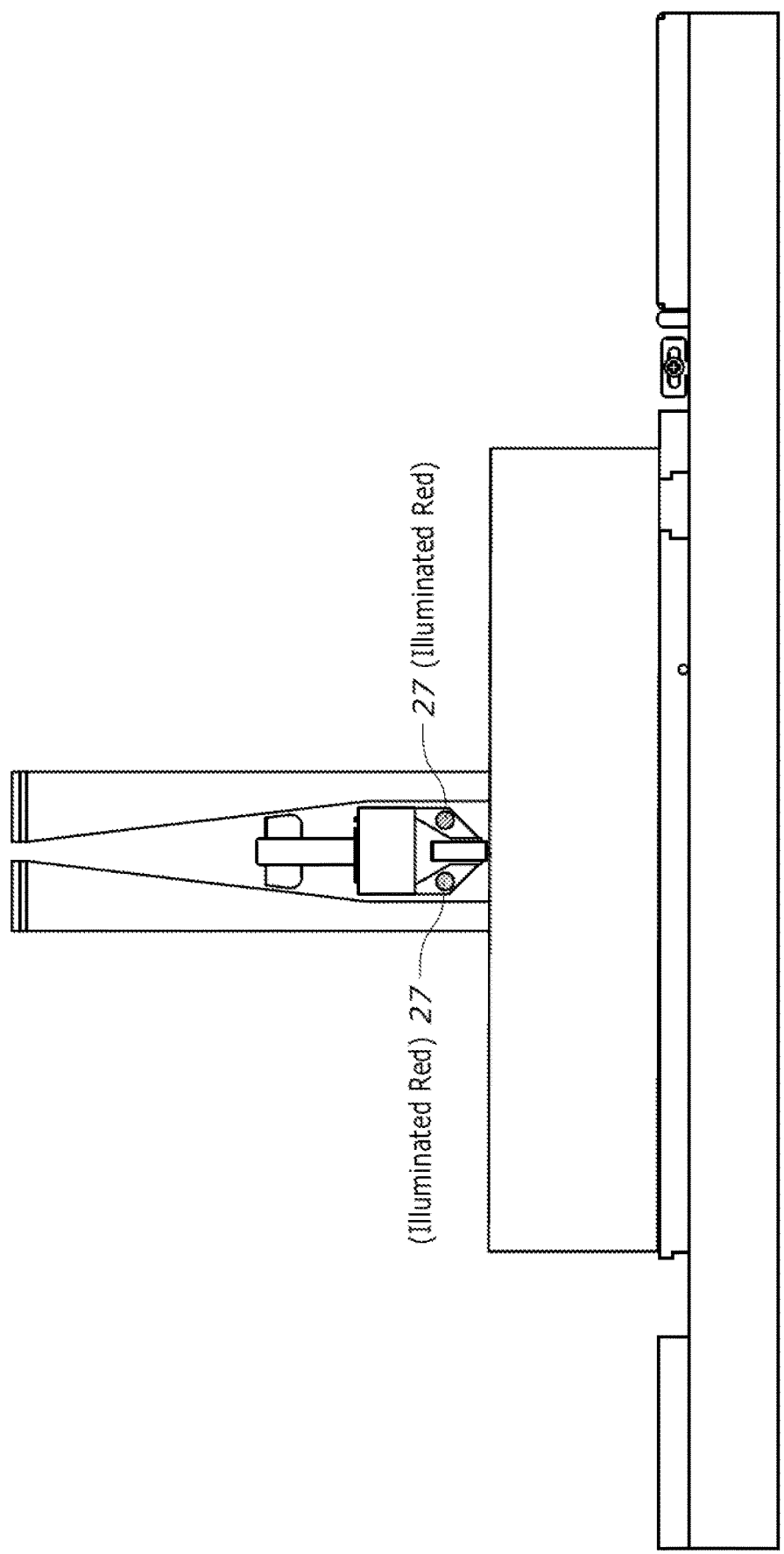
Figure 3:
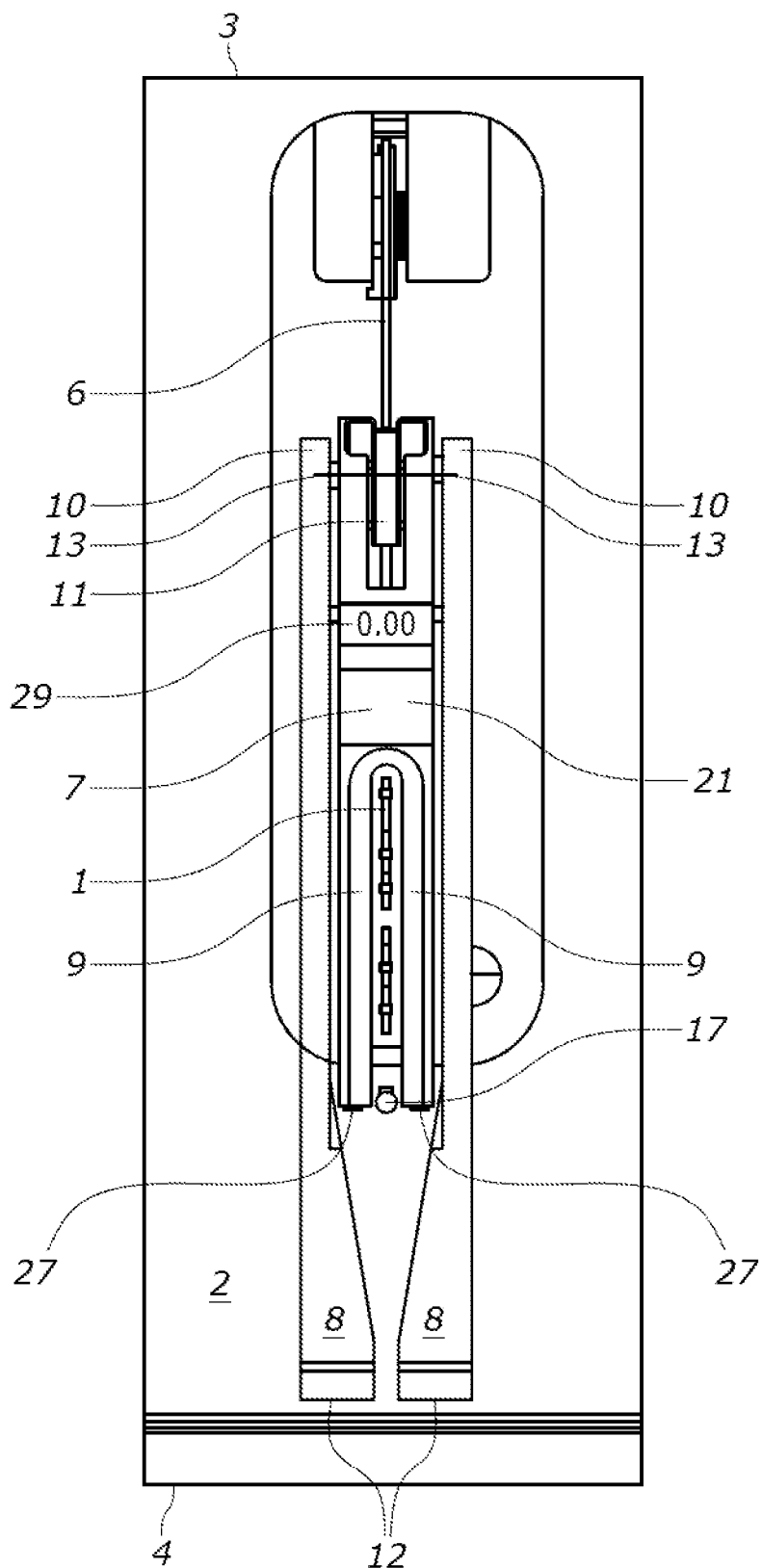
FIG. 3 provides a top view of a table saw equipped with a blade-height optimization indicator.
Figure 4A:
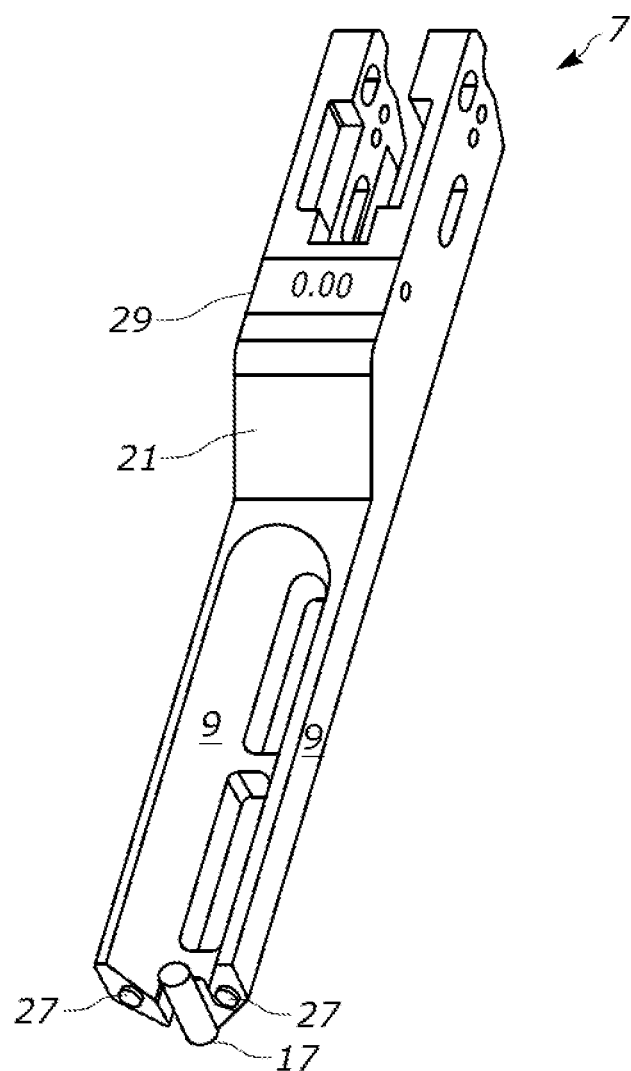
FIGS. 4a and 4b provide, respectively, an isometric view and a side view of a fork for a table saw equipped with a blade-height optimization indicator.
Figure 4B:
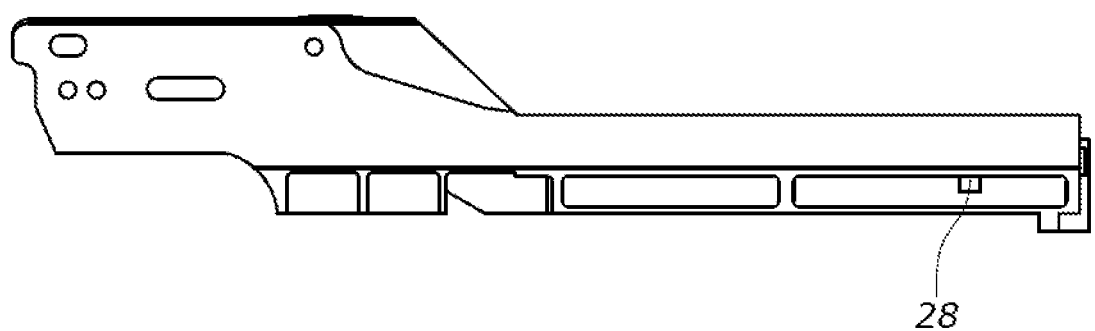
Figure 5:
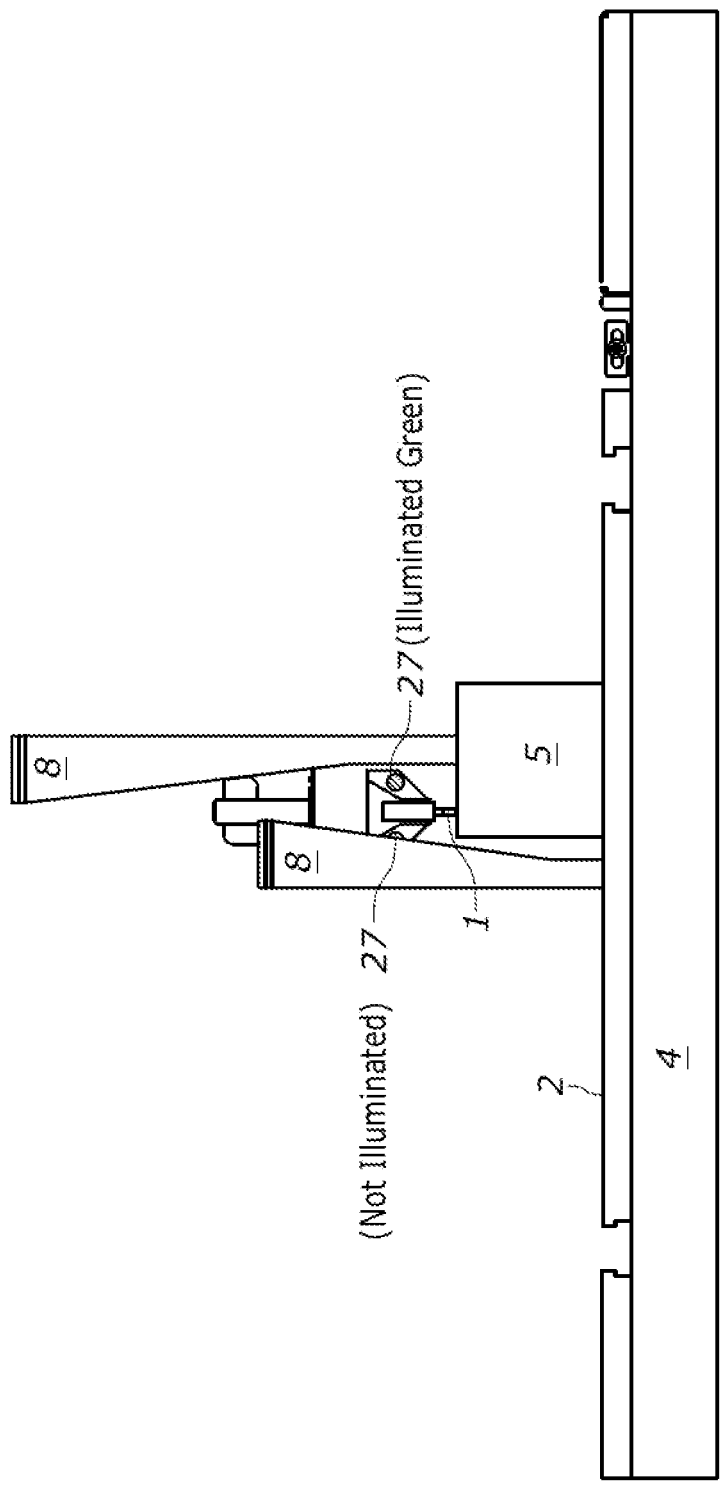
FIG. 5 provides a front view, in a use case in which the working angles of two blade guards are different, of a table saw equipped with a blade-height optimization indicator according to the present invention.

As noted above, FIGS. 1 and 2 illustrate three different use cases for a table saw 100 equipped with a blade-height optimization indicator 200 in which a user wishes to cut a workpiece 5 in two. In use case (a), the blade-height H is optimized relative the thickness of the workpiece 5 (because the blade 1 protrudes above the workpiece 5 by no more than approximately 1 cm). In use case (b), the blade 1 is too high (potentially causing performance and safety issues), and in use case (c) the blade is too low (such that the workpiece 5 will not be cut through). FIG. 3 provides an alternate view of the same table saw 100, but with no workpiece present. FIG. 4 provides a detailed view of the fork 7 of the table saw 100. And FIG. 5 illustrates yet another use case for the table saw 100. In all of these figures, which provide various views of various use cases for the same table 100, the reference numerals are used consistently, although not every referenced feature is visible in every figure. The reference numerals are also used consistently in FIG. 6, which provides a hardware block diagram for a blade-height optimization indicator 200.

As shown in FIGS. 1 through 5, a table saw 100 consists of a circular saw blade 1 mounted to an arbor (not shown) beneath a horizontal table 2, the table 2 forming the working surface of the table saw. The blade 1 is disc-shaped and rotates in a plane that is perpendicular to the table 2 (i.e., vertically). The direction of rotation D of the blade 1 is from a rear side 3 of the table saw towards a user side 4 of the table saw (clockwise as shown), such that the blade 1 rotates generally towards the user and the workpiece 5. The blade 1 protrudes through an opening in the table 2, with the table 2 providing support for the workpiece 5. A user urges the workpiece 5 along the table 2 from the user side 4 of the table saw towards the rear side 3 of the table saw, such that the blade 1 passes through the workpiece 5, thereby cutting it. A user may configure the height H to which the blade protrudes above the table (i.e., the blade-height), ordinarily by turning a dial or wheel (not shown), which raises and lowers the arbor relative to the table 2.

Also mounted to the arbor and protruding through the opening in the table is a riving knife 6. The riving knife, which is situated just towards the rear side 3 of the table saw relative to the blade 1, is a safety device that prevents the workpiece 5 from gripping the blade 1 which can cause kickback, wherein the workpiece 5 is forcibly ejected from the table 2 by the blade 1, often towards the user. Because the riving knife 6 is mounted to the arbor, it is fixed relative to the blade 1, raising and lowering together with the blade 1.

Mounted to the riving knife 6 is a fork 7 and one or more blade guards 8. The fork 7, whose details are visible in FIG. 4, is an elongated structure of a rigid material which extends substantially horizontally towards the user side 4 of the table saw 100 from the riving knife 6. Its position and orientation are fixed relative to the saw blade 1, being situated above and extending over the blade 1, thereby preventing accidental contact with the blade 1 from above. The fork is split into two tines 9 to avoid obstructing the user's view of the blade.

The blade guards 8 of the table saw 100 are of rigid material (preferably plastic) and rotatably mounted to the riving knife 6. Together with the fork 7, they serve to further prevent accidental contact with the blade 1. The blade guards 8 are rotatably fixed near their first ends 10, thereby forming an axis of rotation 11 for the blade guard 8. The second ends 12 of the blade guards 8 are movable in an arcuate path P around the axis rotation 11, the arcuate path P being in a plane parallel to the blade (i.e., vertical). As a user urges a workpiece 5 of thickness T along the table 2 towards the blade 1, the second ends 12 of the blade guards are displaced upwards from the table, thereby rotating the blade guards 8 about their axes of rotation to a working angle Aw. For purposes of this description, the working angle Aw is defined relative to a hypothetical 0° angle parallel to the table 2, with Aw increasing as the blade guard S rotates down towards the table 2 (clockwise as shown). At a given blade height H, the value of Aw depends on the thickness T of the workpiece, with a thicker workpiece corresponding to a lower Aw and a thinner workpiece corresponding to a higher Aw. The table saw 100 preferably includes two blade guards 8, but may alternatively include one blade guard 8. If two blade guards 8 are present, one blade guard 8 is located on each side of the blade 1, with each blade guard 8 rotating independently of the other. If one blade guard 8 is present, the guard is centered over the blade 1 and extends horizontally to both sides of the blade 1.

For each blade guard 8 of the table saw 100, an angle sensor 13 is affixed at or near the axis of rotation 11. The angle sensors 13 are preferably rotary potentiometers but could alternatively be rotary encoders or any other suitable device. The angle sensors 13 receive power from a controller 14 (described below) and return an angle sensor signal 15 indicative of the angular position Aw of the blade guard 8 about its axis of rotation 11. In the disclosed embodiment, the angle sensor signal 15 is an analog voltage proportional to the angle of rotation Aw of the blade guard, but alternatively the angle sensor signal could be a single or multi-line digital signal.

Figure 1A:
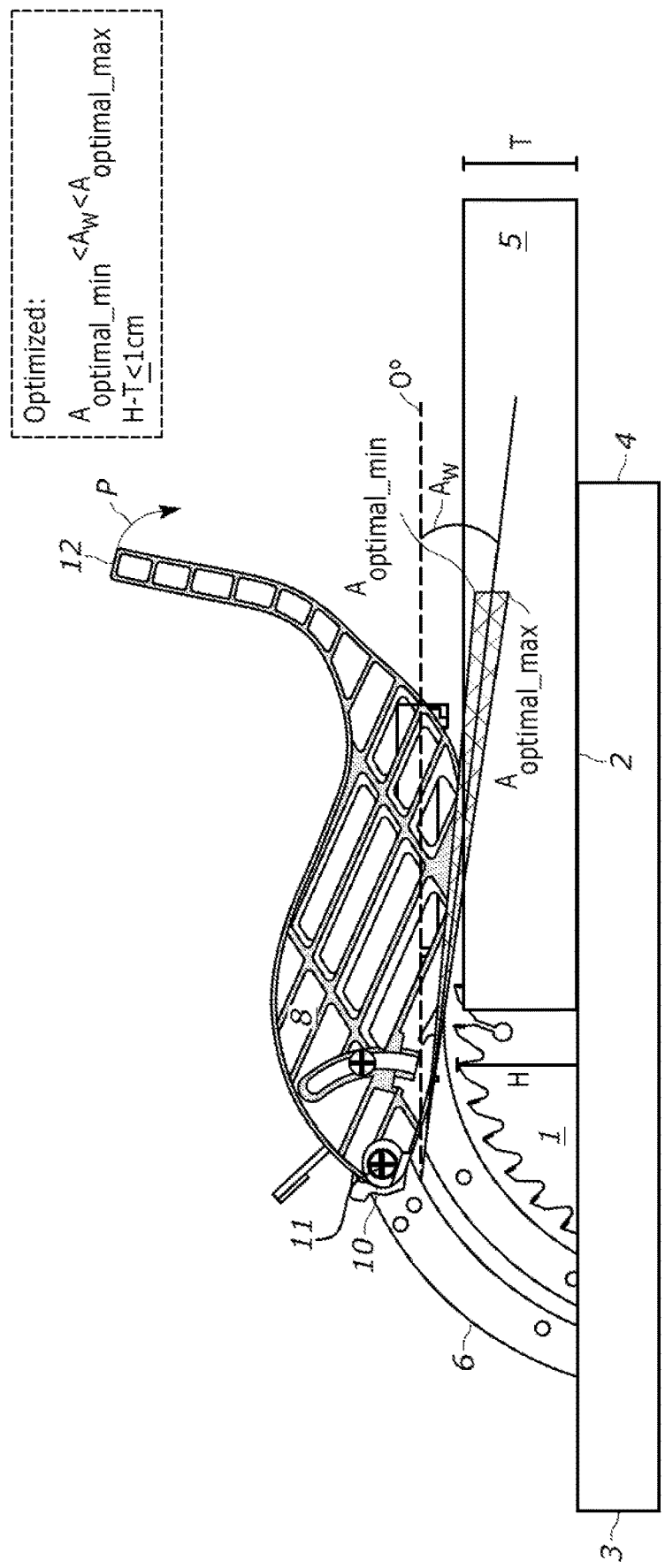
FIGS. 1a, 1b, and 1c provide side views, in three different use cases, of a table saw equipped with a blade-height optimization indicator.
Figure 1B:
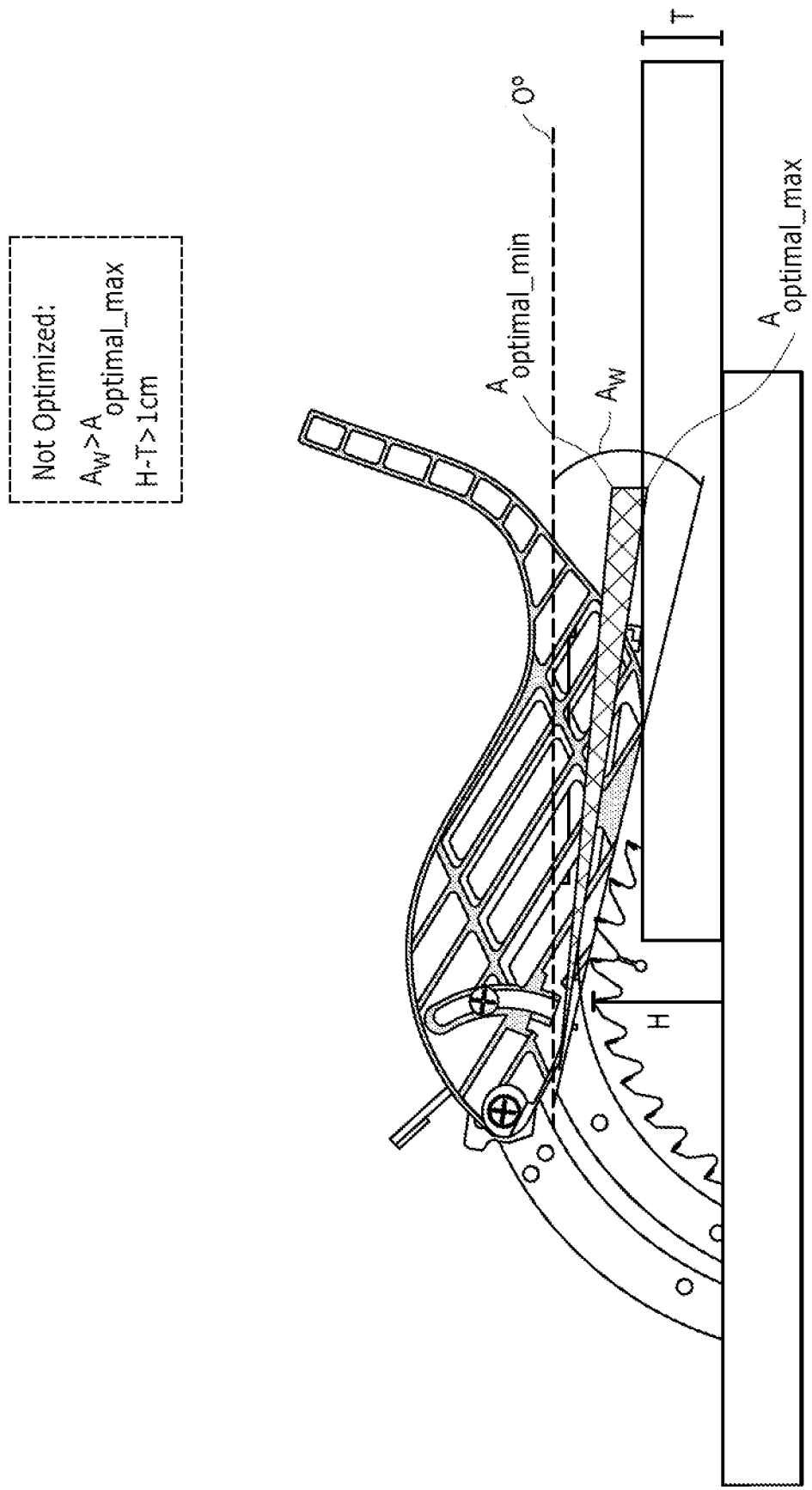
Figure 1C:
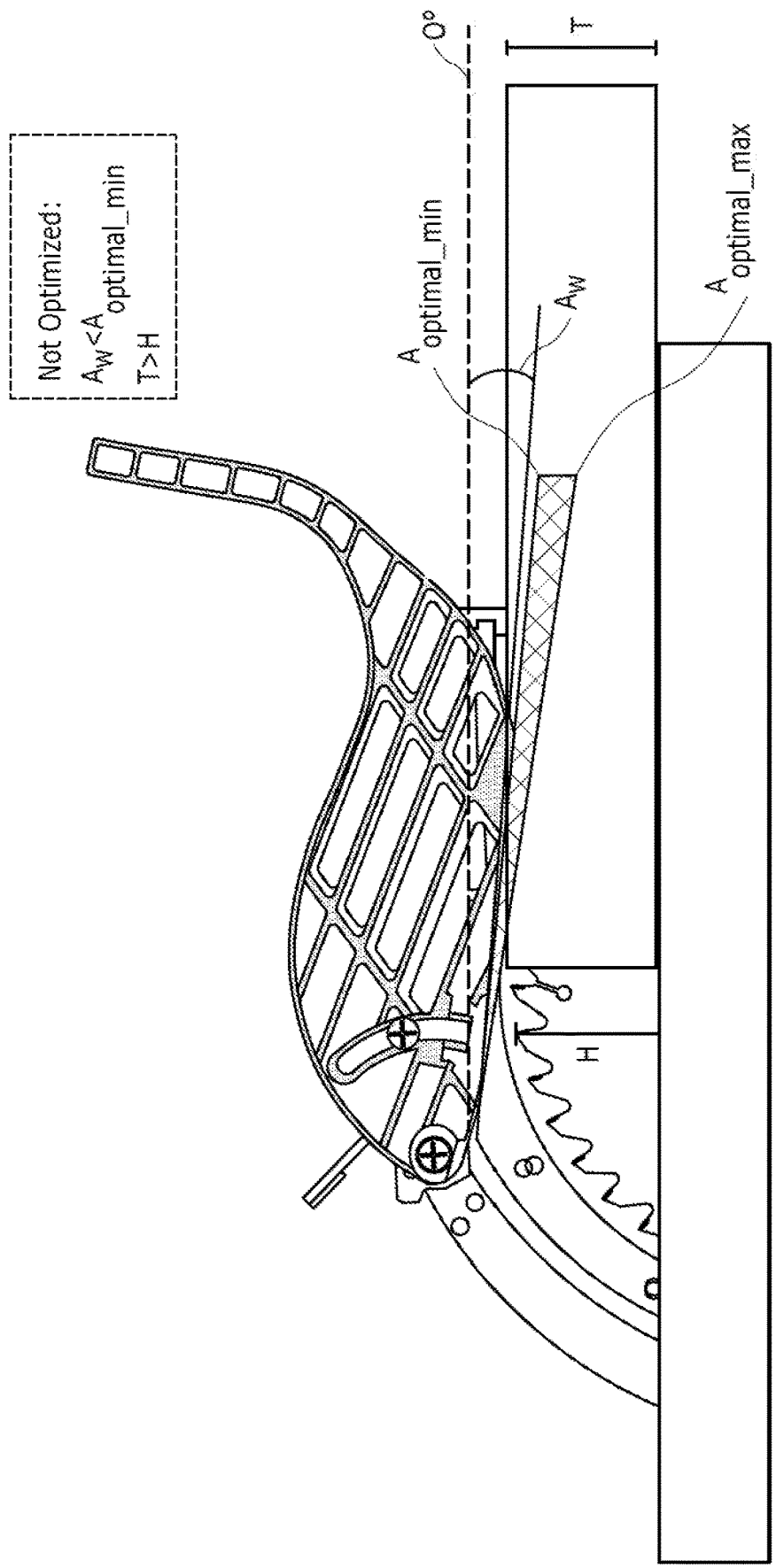

Because during normal operation of the table saw 100 the position of the riving knife 6 is fixed relative to the blade 1, the range of angular positions of the blade guards & corresponding to an optimized blade-height does not change with the blade-height H. As shown in FIG. 1, the range of angular positions corresponding to an optimized blade-height extends from a minimum optimal angle Aoptimal_min to a maximum optimal angle Aoptimal_max. If Aw is greater than or equal to Aoptimal_min and less than or equal Aoptimal_max, the blade-height H is optimized relative to the thickness of the workpiece 5. In other words, with a low blade-height, a relatively thin workpiece will move the blade-guard to the optimal range, whereas a higher blade-height would require a thicker workpiece to move the blade guard to the optimal range. Because the precise optimal range depends on the configuration of the riving knife 6 and the saw blade 1 (including blade size), the blade-height optimization indicator must be recalibrated after making adjustments to the configuration of the riving knife 6 or blade 1.

Additional sensors of the blade-height optimization indicator may include a vibration sensor 16 and a proximity sensor 17. The vibration sensor 16, which is preferably a MEMS accelerometer (but alternatively could be a piezo-electric accelerometer or other suitable device), receives power from the controller 14 (or alternatively is self-powered) and returns a vibration sensor signal 18 indicative of the vibration of the table saw 100. In the disclosed embodiment, the vibration sensor 16 is located within the same housing as the controller 14, but it may alternatively be mounted to a surface of the table saw and transmit the vibration sensor signal to the controller via wire or wirelessly. The vibration sensor signal 18 is used by the controller 14 to determine whether the table saw 100 is in use.

The proximity sensor 17 is preferably an infrared proximity sensor, but could operate based on ultrasonic or any suitable technology. The proximity sensor 17 may be located within the same housing as the controller 14 or display 19 (described below) of the blade-height optimization indicator or be mounted externally to the fork 7 or other suitable surface of the table saw 100. The proximity sensor 17 receives power from the controller 14 (or alternatively is self-powered) and returns a proximity sensor signal 20 indicative of the distance from the proximity sensor 17 to the table 2. The proximity sensor signal 20 is used by the controller to determine the blade-height H.

The controller 14 of the blade-height optimization indicator consists generally of a printed circuit board (PCB) within a housing 21. Preferably, the housing 21 is integral to the fork 7 of the table saw, such that installing the blade-height optimization indicator may entail replacing a factory-original conventional fork. Alternatively, the controller housing 21 may be mounted to the existing fork of the table saw.

Figure 6:
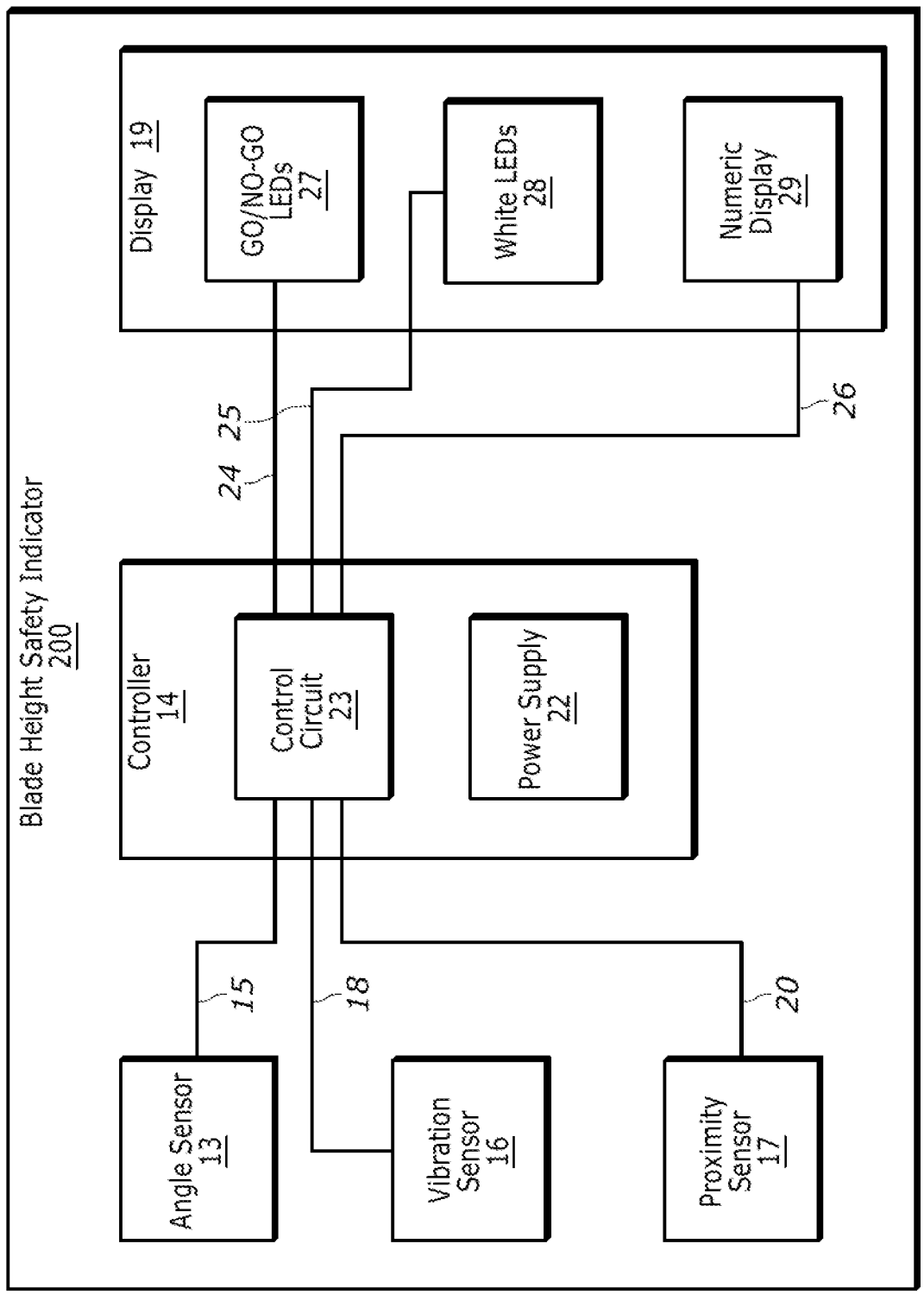
FIG. 6 is a hardware block diagram of a blade-height optimization indicator.

As shown in FIG. 6, the controller 14 preferably comprises various components including a power supply 22 and a control circuit 23. The power supply 22 may include one or more replaceable alkaline batteries and supplies a DC operating voltage to the control circuit 23. The control circuit 23 is preferably an application-specific integrated circuit (ASIC) capable of receiving analog and digital inputs and selectively setting digital outputs based on said inputs. The control circuit 23 of the controller 14 receives as inputs the angle sensor signals 15 and, optionally, a vibration sensor signal 18 and/or proximity sensor signal 20. The controller 14 outputs an indicator control signal 24 corresponding to each angle sensor signal 15, and optionally, an illumination control signal 25 and/or blade height signal 26. For each angle sensor signal 15 received, the controller 14 begins outputting the corresponding indicator control signal 24 upon a change in the angle sensor signal 15. If there is no change in the angle sensor signal 15 for a suitable timeout duration, such as one minute, the controller stops outputting the corresponding indicator control signal 24. While outputting the illumination control signal 24, the controller 14 determines whether the angular position of the corresponding blade guard is in the optimal range (i.e., whether Aw is greater than Aoptimal_min and less than Aoptimal_max) and sets the corresponding indicator control signal 24 accordingly. Preferably, each indicator control signal 24 is a two-bit digital signal carried electrically from the controller 14 to the display 19, where the first bit is a GO bit and the second bit is a NO-GO bit. If Aw is in the optimal range, then the controller 14 sets the GO bit of the corresponding indicator control signal 24 to high and the NO-GO bit to low. If Aw is not in the optimal range, then the controller 14 sets the NO-GO bit to high and the GO to low. Preferably, each of the GO and NO-GO bit lines of the indicator control signals 24 provides sufficient current to illuminate a corresponding GO LED or NO-GO LED, respectively (such that when the bit line is high, the LED is illuminated). As shown in FIG. 5, a set of corresponding GO/NO-GO LEDs 27 may be located adjacent to each other behind a shared cover or lens.

When a vibration sensor 16 is present, the controller 14 continuously monitors the vibration sensor signal 18 and identifies based on the profile of the vibration when the blade of table saw begins spinning and stops spinning. Preferably, the illumination control signal 25 is a one-bit digital signal carried electrically from the controller 14 to the display 19 and through amplification such as by way of a drive circuit comprising a bipolar junction transistor (BJT) provides sufficient current to illuminate one or more white LEDs 28. Preferably, when the controller 14 determines based on the vibration sensor signal 18 that the saw blade 1 starts, it sets the illumination control signal 25 to high, thereby illuminating the white LEDs 28. When the controller 14 determines that the saw blade 1 has stopped spinning, the illumination control signal 25 is set to low and the white LEDs 28 are extinguished.

When a proximity sensor 17 is present, the controller calculates a blade height based on the proximity sensor signal 20—taking into account any vertical offset between the proximity sensor 17 and the top of the blade 1—and sets the blade height signal 26 accordingly. Because the offset amount may vary based on the configuration of the riving knife 6, fork 7, and saw blade 1 (including blade size), calibration of the proximity sensor 17 via the controller 14 is required after making adjustments to the configuration of the riving knife, fork, and/or blade.

As noted above, and as illustrated in FIG. 5, in table saws with two independently-moving blade guards 8, the blade guards' respective working angles (Aw) may vary independently from each other. Consequently, the indicator control signals 24 output by the controller 14 and corresponding to each blade guard 8 are independent from each other. For example, in FIG. 5, the left-hand GO/NO-GO LED 27 is not illuminated but the right-hand GO/NO-GO LED 27 is illuminated in green. The left-hand GO/NO-GO LED 27 is not illuminated because the left-hand blade guard 8 has not moved off the table 2 and thus the controller 14 is not currently outputting an indicator control signal 24 corresponding to that blade guard 8. Optionally, where a proximity sensor 17 is present, the controller 14 does not output an indicator control signal 24 when the corresponding blade guard & is determined to be resting on the table 2 based on the corresponding angle sensor signal 15 and blade height calculated based on the proximity sensor signal 20. As for the right-hand GO/NO-GO LED 27, it is illuminated in green in FIG. 5 because the working angle of the right-hand blade guard 8 is in the optimal range. This is because, in the illustrated use case, the blade-height H is optimized relative to the thickness T of the workpiece 5, although workpiece 5 does not make contact with the left-hand blade guard 8. Additionally, and as shown in FIG. 5, in table saws with two independently moving blade guards 8, there are two sets of GO/NO-GO LEDs 27, one for each blade guard 8. Each set of GO/NO-GO LEDs 27 is located on the same side of the saw blade 1 as the blade guard 8 to which it corresponds, thus making it obvious to a user which set of LEDs 27 corresponds to which blade guard 8.

The display 19 of the blade-height optimization indicator, which may comprise one or more GO/NO-GO LEDs 27, one or more white LEDs 28, a numeric display 29 (described below), or any other suitable components, is preferably integral to the fork 7 of the table saw 100 (such that, as noted above, installing the blade-height optimization indicator may entail replacing a factory-original, conventional fork) but alternatively may be mounted to an existing fork. The GO/NO-GO LEDs 27 are preferably situated on a front surface of the fork 7 (or other display housing) facing the user side 4 of the table saw 100, such they are clearly visible to a user. To align with user expectations, the GO/NO-GO LEDS 27 include green LEDS to indicate a GO condition and red LEDs to indicate a NO-GO condition. The GO/NO-GO LEDs 27 are optionally adapted to emit light into the blade guards 8 of the table saw 100—with the blade guards 8 optionally being constructed of translucent material-such that a blade guard 8 is illuminated in the same color as its corresponding GO/NO-GO LED 27.

The display 19 is preferably integrated into the same housing 21—or even the same PCB—as the controller 14 (such as when they both integrated into the fork) or alternatively may have its own separate housing (for example the display may be integrated into the fork while the controller has its own separate housing). As noted above, the display 19 may include one or more white LEDs 28 to illuminate the workpiece 5, with such illumination preferably being directed at the point where the workpiece 5 meets the saw blade 1. The white LEDs 28—which themselves may comprise multiple LEDs of different colors to create white light—are activated by the illumination control signal 25 received from the controller 14.

The display 19 may further include a numeric display 29, such as a liquid crystal display (LCD). The numeric display 29 preferably receives power from the controller 14 and is updated by the controller 14 via the blade height signal 26, which in the disclosed embodiment is a multi-bit digital signal carried electrically from the controller to the display.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A blade-height optimization indicator attachable to a table saw having a table surface, a fork, a blade protruding through the table surface to with a configurable height, a riving knife that is fixed relative to the blade, and one or more blade guards each of which at a first end is rotatably mounted to the riving knife, thus forming an axis of rotation of the blade guard, and at a second end is displaceable upwards as a workpiece to be cut on the saw is urged along the table surface towards the blade thereby rotating the blade guard around the axis of rotation, the optimization indicator comprising:
    a first angle sensor adapted to output a first angle sensor signal indicative of the angular position about the axis of rotation of a first one of the blade guards of the table saw;
    a controller adapted to receive the first angle sensor signal and output a first indicator control signal, wherein the first indicator control signal indicates based on the first angle sensor signal whether the height of the blade is optimized relative to a thickness of a workpiece; and
    a display adapted to receive the first indicator control signal and visually indicate based on the first indicator control signal whether the height of the blade is optimized.

2. The blade-height optimization indicator of claim 1, wherein the display comprises a first GO light emitting diode of a first color which activates while the first indicator control signal indicates that the height of the blade is optimized.

3. The blade-height optimization indicator of claim 2, wherein the display further comprises a first NO-GO light emitting diode of a second color which activates while the first indicator control signal indicates that the blade height is not optimized.

4. The blade-height optimization indicator of claim 3, wherein the GO and NO-GO light emitting diodes comprise light emitting diodes adapted to emit light into the first blade guard of the table saw such that the first blade guard is illuminated in the first color while the height of the blade is optimized and in the second color while the height of the blade is not optimized.

5. The blade-height optimization indicator of claim 3, wherein the display further comprises a white light emitting diode adapted to illuminate the workpiece.

6. The blade-height optimization indicator of claim 5 further comprising:
    a vibration sensor adapted to output a vibration sensor signal indicative of whether the blade of the table saw is spinning, wherein the controller is further adapted to receive the vibration sensor signal and output an illumination control signal based on the vibration sensor signal, and wherein the white light emitting diode activates based on the illumination control signal.

7. The blade-height optimization indicator of claim 3, further comprising:
    a second angle sensor adapted to output a second angle sensor signal indicative of the angular position about an axis of rotation of a second one of the blade guards of the table saw, wherein the controller is further adapted to receive the second angle sensor signal and output a second indicator control signal, wherein the second indicator control signal indicates based on the second angle sensor signal whether the height of the blade is optimized relative to a thickness of a the workpiece, and wherein the display is further adapted to receive the second indicator control signal and visually indicate based on the second indicator control signal whether the height of the blade is optimized.

8. The blade-height optimization indicator of claim 7, wherein the display further comprises a second GO light emitting diode of the first color which activates while the second indicator control signal indicates that the blade height is optimized.

9. The blade-height optimization indicator of claim 8, wherein the display further comprises a second NO-GO light emitting diode of the second color which activates while the second indicator control signal indicates that the blade height is not optimized.

10. The blade-height optimization indicator of claim 9, wherein the first GO and first NO-GO light emitting diodes comprise light emitting diodes adapted to emit light into the first blade guard of the table saw, and the second GO and second NO-GO light emitting diodes comprise light emitting diodes adapted to emit light into the second blade guard of the table saw, such that the first blade guard is illuminated in the first color while the height of the blade is optimized according to the angular position of the first blade guard and in the second color while the height of the blade is not optimized according to the angular position of the first blade guard, and such that the second blade guard is illuminated in the first color while the height of the blade is optimized according to the angular position of the second blade guard and in the second color while the height of the blade is not optimized according to the angular position of the second blade guard.

11. The blade-height optimization indicator of claim 9, wherein the display further comprises a white light emitting diode adapted to illuminate the workpiece.

12. The blade-height optimization indicator of claim 11 further comprising:
   a vibration sensor adapted to output a vibration sensor signal indicative of whether the blade of the table saw is spinning, wherein the controller is further adapted to receive the vibration sensor signal and output an illumination control signal based on the vibration sensor signal, and wherein the white light emitting diode activates based on the illumination control signal.

13. The blade-height optimization indicator of claim 1 further comprising:
   a proximity sensor adapted to output a proximity sensor signal indicative of a height of the proximity sensor above a surface of the table saw, wherein the proximity sensor is mountable to the fork of the table saw, and wherein the controller is further adapted to receive the proximity sensor signal and output a blade height signal based on the proximity sensor signal, and wherein the display further comprises a numeric display and is further adapted to receive the blade height signal and update the numeric display to indicate based on the blade height signal the height of the blade.

* * * * *